US009533322B2

(12) United States Patent
Atwool et al.

(10) Patent No.: US 9,533,322 B2
(45) Date of Patent: Jan. 3, 2017

(54) IRRIGATION

(75) Inventors: Anthony Atwool, Timaru (NZ); Jonathan Gray, Ashburton (NZ)

(73) Assignee: RX PLASTICS LIMITED, Ashburton (NZ)

( * ) Notice: Subject to any disclaimer, the term of this patent is extended or adjusted under 35 U.S.C. 154(b) by 764 days.

(21) Appl. No.: 13/250,009

(22) Filed: Sep. 30, 2011

(65) Prior Publication Data

US 2013/0082124 A1 Apr. 4, 2013

(30) Foreign Application Priority Data

Sep. 30, 2011 (NZ) ........................................ 595505

(51) Int. Cl.
*A01G 25/02* (2006.01)
*B05B 15/10* (2006.01)
*B05B 15/06* (2006.01)

(52) U.S. Cl.
CPC .............. *B05B 15/10* (2013.01); *B05B 15/063* (2013.01)

(58) Field of Classification Search
CPC ............................... B05B 7/0093; B05B 15/10
USPC ................................. 239/172, 203, 204, 266
See application file for complete search history.

(56) References Cited

U.S. PATENT DOCUMENTS

| | | | | |
|---|---|---|---|---|
| 2,678,844 | A | 5/1954 | Hondeville | |
| 3,445,066 | A | 5/1969 | Mohar | |
| 4,519,544 | A | 5/1985 | Szabo | |
| 4,789,099 | A * | 12/1988 | Hager | 239/10 |
| 4,824,020 | A * | 4/1989 | Harward | B05B 15/063 239/264 |
| 5,702,056 | A | 12/1997 | Yang | |
| 6,135,362 | A | 10/2000 | Purdy | |
| 7,059,539 | B2 * | 6/2006 | Steingass et al. | 239/203 |
| 2002/0179733 | A1 * | 12/2002 | Clark | 239/203 |
| 2005/0284956 | A1 * | 12/2005 | Mast | 239/288 |

FOREIGN PATENT DOCUMENTS

| | | |
|---|---|---|
| GB | 2 056 239 | 3/1981 |
| WO | 00/16608 | 3/2000 |
| WO | 2009/009125 | 1/2009 |

* cited by examiner

*Primary Examiner* — Davis Hwu
(74) *Attorney, Agent, or Firm* — Greer, Burns & Crain, Ltd.

(57) ABSTRACT

A sprinkler apparatus includes a sprinkler head, a riser which is in fluid communication with a fluid inlet and the sprinkler head, a base for supporting and maintaining the sprinkler head in an upright position when the base is in contact with the ground or other surface; and wherein, the riser extends substantially vertically from the base a distance at least twice the width of the base and the base is configured to allow the apparatus to be pulled over the ground.

17 Claims, 6 Drawing Sheets

IRRIGATION

TECHNICAL FIELD

The present invention relates to improvements in irrigation. In particular, the invention relates to a sprinkler apparatus for delivering a liquid such as effluent, water, liquid fertiliser or the like for commercial use on small or large scale areas of horticultural land.

BACKGROUND ART

In horticulture given the height of many crop plants irrigation systems tend to be:

In situ systems which are fixed in place e.g. buried pipes or plumbed systems used in hot houses;

High pressure systems using long reaching water jets;

Expensive pivot irrigators which again tend to suffer from being difficult to transport between fields on a regular basis.

There thus exists in horticultural or horticulture a real need for a mobile irrigation system which can operate on low pressure, such as mains pressure, which can spread fluid over crop plants situated one or more plants away from the sprinkler.

Such systems are either fixed in place, or require a major amount of labour, large vehicles or other equipment in order to move the system from one paddock to another, or to another part of the same paddock.

This lack of portability, together with the initial setup costs, contributes to a higher capital cost to the user.

These large irrigation systems also have a further disadvantage of being difficult to manoeuver into the required position on horticultural land such as orchards where movement is restricted by the trees.

Furthermore, these large irrigation systems also operate under high pressure which can easily damage the vegetation of the trees.

Therefore, small above ground irrigation systems with low-volume, low-pressure sprinkler heads are also known which provide improved portability. For example, New Zealand Patent No. 510282 discloses a sprinkler apparatus which comprises a housing to substantially protect a sprinkler unit mounted in the housing from damage, yet at the same time allows at least a portion of the sprinkler head to protrude above at least part of the upper edge of the housing. This type of sprinkler apparatus is commonly used in agriculture for farmed animals such as sheep, cattle, goats or deer and allows animals to continue to graze a paddock that has been irrigated using this type of low-pressure sprinkler system. Therefore, the sprinkler housing provides some form of protection to protect the sprinkler unit from damage.

New Zealand Patent No. 532441 discloses another low-pressure sprinkler apparatus which includes a housing and a strut. The strut extends from one side of the wall portion of the housing, above and over any moving parts of the sprinkler, and down to the opposite side of the wall portion of the housing. The purpose of the strut is to further prevent damage of the sprinkler unit by animals which may inadvertently kick or step onto or into the sprinkler apparatus.

However, a disadvantage of the above sprinkler apparatus is that the sprinkler head is mounted low and substantially within the housing of the sprinkler apparatus for protection. This type of configuration, although it provides protection from animals, it is particularly unsuitable for use in horticultural situations. This is because the sprinkler is located too low relative to the height of most crop plants to deliver fluid effectively. As the fluid only tends to reach plants directly adjacent to the sprinkler affecting the reach of the sprinkler and as a result not watering neighbouring plants which have plants between them and a sprinkler. Where for example, the sprinkler needs to deliver water to canopies or the tops of bushes that need to be irrigated.

As the sprinkler head is mounted low, it is not able to distribute fluid sufficiently far enough to provide the necessary irrigation to the canopy layer of trees, vines or the tops of other crop plants.

An object of the present invention, is to provide a sprinkler apparatus which overcomes the disadvantages of irrigation apparatus described above.

It is a further object of the present invention to at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word “comprise”, or variations thereof such as “comprises” or “comprising”, will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to a first aspect of the present invention there is provided a sprinkler apparatus which comprises:

a sprinkler head;

a riser which is in fluid communication with a fluid inlet and the sprinkler head;

a base for supporting and maintaining the sprinkler head in an upright position when the base is in contact with the ground or other surface; and wherein the riser extends substantially vertically from the base a distance at least twice the width of the base and the base is configured to allow the apparatus to be pulled over the ground.

Preferably, the riser extends substantially vertically from the base no more than five times the width of the base.

In alternative embodiments, the riser may be telescopic and in use extends substantially vertically from the base at least twice the width of the base, but no more than five times the width of the base.

The term “width” as used herein refers to a lateral direction with respect to the longitudinal axis of the fluid line(s) supplying fluid to the sprinkler apparatus.

Preferably, the base may comprise at least one curved peripheral side wall or upturned edge, extending from a generally planar surface, to form a rim.

The base may be configured in a variety of different ways to allow the apparatus to ride over a ground surface with bumps and the like when in use or being transported. For example, the base may comprise rounded peripheral edges to deal with bumps and uneven ground surfaces.

Preferably, a supporting member or framework may engage with the rim to support the riser.

Preferably, the width of the base may be dimensioned to provide a stable platform to maintain the sprinkler head and riser in an upright position when the sprinkler is distributing fluid.

More preferably, the width of the base may be dimensioned to be in the range of 360 mm to 550 mm.

In alternative embodiments, a container portion of the base may optionally be filled with water to provide weight and additional stability to maintain the sprinkler head and riser in an upright position when the sprinkler head is distributing the fluid.

In alternative embodiments, the base may be in the form of at least one tube.

Preferably, the sprinkler apparatus may be configured to releasably receive at least one conduit (fluid line) and provide a fluid connection from the at least one conduit to the riser and sprinkler head with fluid for irrigation.

In general the fluid line(s) connect to the apparatus at a point which is along a bilateral axis of the base.

Preferably, the base may be in the shape of a bowl with a flat base on the inside of a circular wall.

Preferably, the base and wall portion(s) may be plastics or substantially of plastics.

According to a second aspect of the present invention there is provided an irrigation system which includes at least two sprinkler apparatus substantially as described above in a string.

Preferably, the irrigation system comprises:

at least two sprinkler apparatus substantially as described above in a string; and a plurality of fluid conduits;

wherein, each of said sprinkler apparatus is configured to be releasably connected to:

at least two fluid conduits; or at least one fluid conduit and one stopper;

so as to create at least two sprinklers, or one line of sprinklers linked by one or more fluid conduits, that any number of sprinkler apparatus may be added thereto or removed therefrom depending on requirements of the area to be irrigated.

The term "effluent" should be given its standard meaning in the art and includes a range of waste products including waste water, sewage, dairy effluent and other types of industrial effluent. The term also includes effluent with minimal particulate matter (such as produced when a filtration system is used) to substantially raw effluent containing larger particulate matter.

The term "fluid" should be understood to mean any substance capable of flowing. It is to be clear to a person skilled in the art this term is not intended to be limiting and the sprinkler apparatus may be used for delivering a range of fluids, such as water for standard irrigation purposes, liquid fertilisers, effluent or any other fluid that requires distribution to a large area such as orchards.

The term "riser" as used throughout the specification should be taken to mean a vertical pipe or equivalent used to extend the height of the sprinkler head of a sprinkler apparatus relative to a base.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
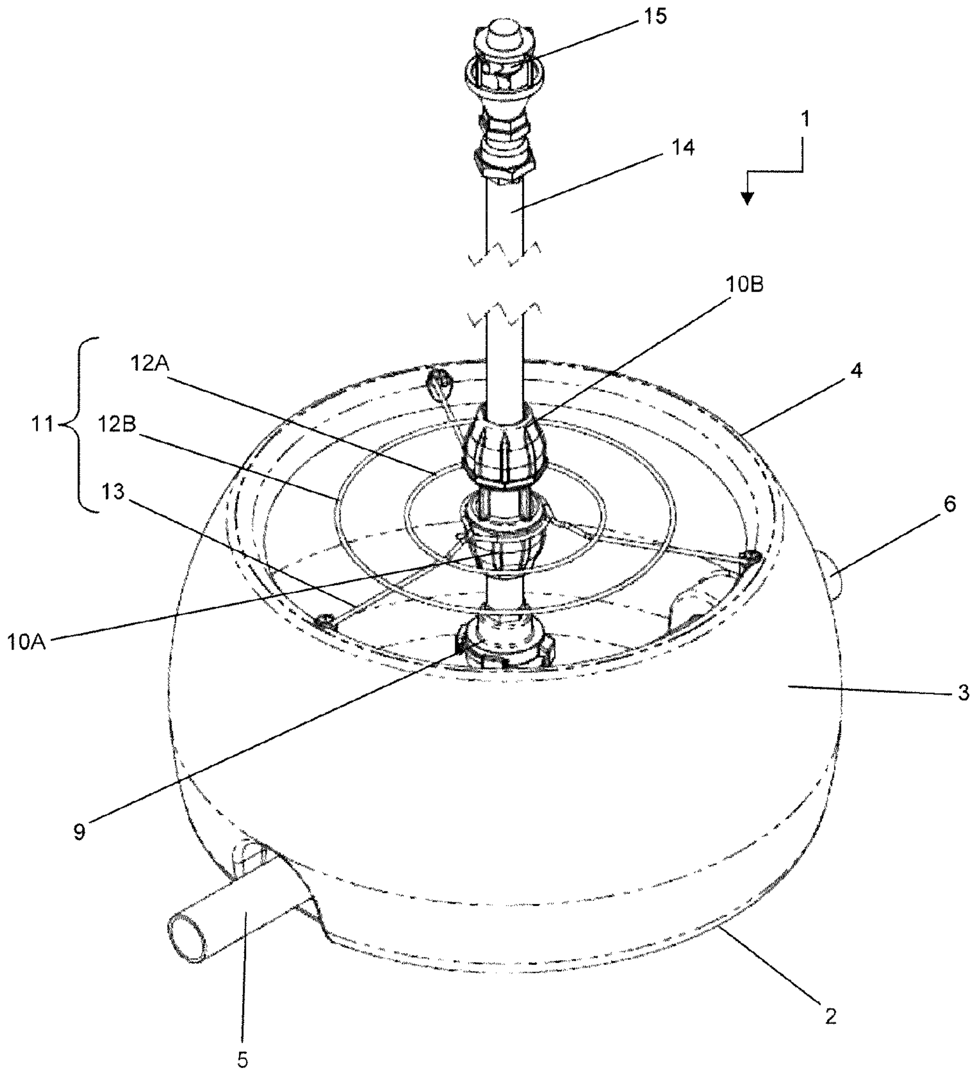
FIG. 1 is a perspective view of the sprinkler apparatus in a preferred embodiment of the present invention.

With reference to FIG. 1, the sprinkler apparatus (1) has a ground engaging base (2) with a curved peripheral side wall (3), the side wall (3) being arcuate in cross-section and fixed to the base (2) extending to a rim (4). The base (2) and the side wall (3) are formed integrally, by a moulding technique well known in the art in the shape of a "bowl". The side wall (3) is adapted to receive at least one inlet port/conduit (5) and at least one outlet port/conduit (6). The conduits (5 and 6) may include releasable connectors (not shown) and are of a standard connector variety capable of connecting two or more conduits together. There are a number of other connector types known in the art that would be suitable for this purpose. It should also be appreciated that other connection configurations are possible. For example, a single hose or conduit that links a plurality of sprinkler apparatus (1) which also acts as the fluid supply line could conceivably be used with this invention.

Figure 2:
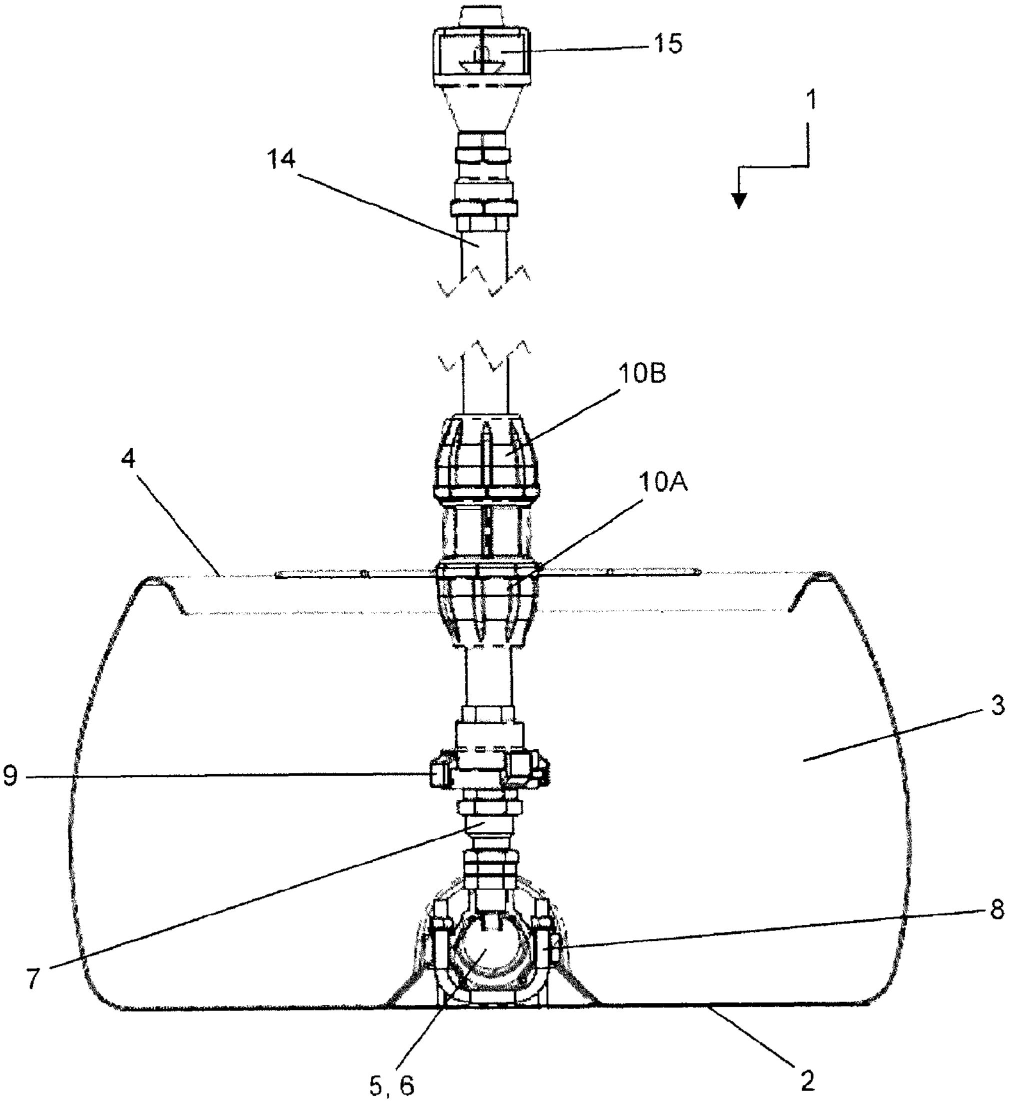
FIG. 2 is a side cross sectional view of the preferred embodiment as shown in FIG. 1.

Referring to FIG. 2, housed within the interior of the base (2) and side wall (3) or "bowl" are further irrigation components such as an upright (7) with an externally threaded shaft and nut (9). The upright (7) is connected to the conduits (5 and 6) with a saddle connection (8).

Figure 3:
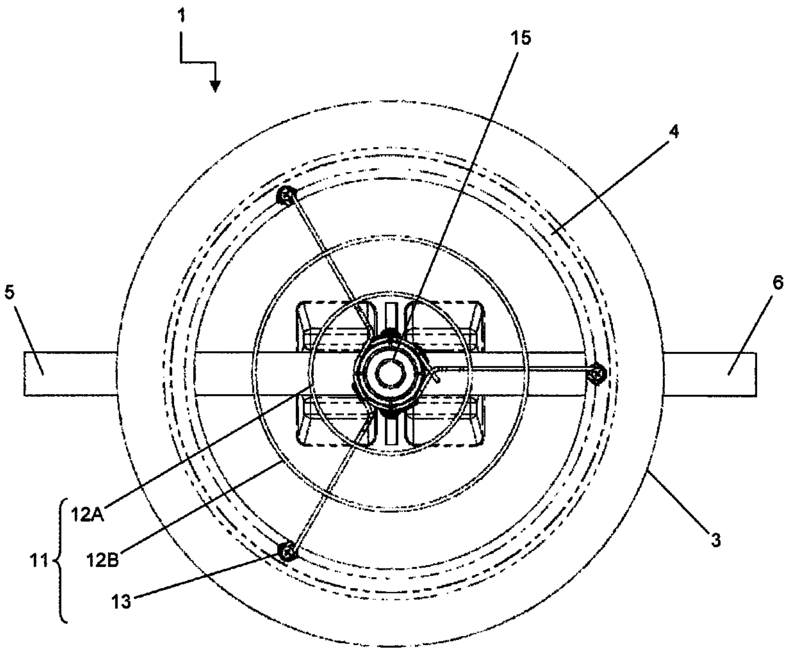
FIG. 3 shows a plan view of the preferred embodiment as shown in FIG. 1.

As shown in FIGS. 1 and 2, a further nut (10A) is positioned on the upright (7) where a supporting means (11) is positioned in the form of two annular rings (12A and B) and three elongate leg members (13) (best seen in plan view FIG. 3). The inner annular ring (12A) is retained by a press fit onto the nut (10A) and is joined to the outer annular ring (12B) by the elongate leg members (13) which extend from the inner annular ring (12A) and is fixedly retained on the rim (4).

The supporting means (11) reduces lateral movement of the upright (7) and a riser (14) which extends therefrom. The riser (14) is releasably connected to the upright (7) by threaded nuts (10A and B) wound onto the threaded shaft of the upright (7). A sprinkler head (15) is connected to the top of the riser (14) in known fashion. The sprinkler head (15) and riser (14) are in fluid communication with conduits (5) and (6) to provide irrigation of a surrounding area of the sprinkler apparatus (1).

The sprinkler head (15) may be of any known type, and selected to be consistent with the pressure and volume of water being supplied. The sprinkler head (15) is generally of the self-rotating type, which can deliver water in a 360° circle over a period of time. Optionally, each sprinkler head (15) is selected as a low-volume, low-pressure head (15).

Whilst the above embodiment has been described with reference to a single water or effluent sprinkler head which is self-rotating, it will be appreciated that such head could be plural in number, for example, a plurality of sprinkler heads which work close together on the same riser. Such heads may be stationary, or have a limited arc of self-rotation. However, for the purposes of this specification, all such variety and arrangement of sprinklers is encompassed by the terminology "sprinkler head".

Figure 4:
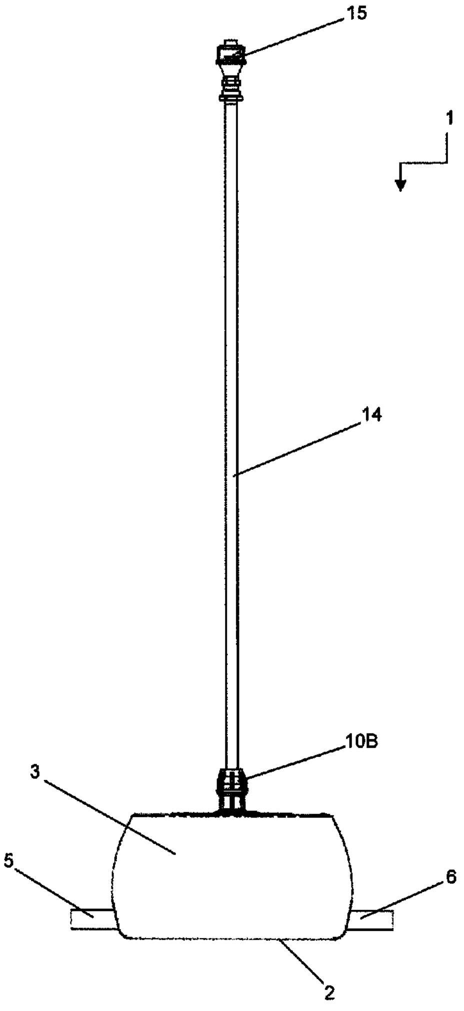
FIG. 4 shows a side view of the preferred embodiment as shown in FIG. 1.

The riser (14) is a hollow tube manufactured out of aluminum or plastic and a purpose is to extend the height of the sprinkler head (15) relative to a ground surface. An advantage of the riser (14) is that it allows the sprinkler head (15) to distribute sufficient irrigation water to the top or canopy layer of bushes, trees and other such vegetation in a horticultural application. The applicant has found that to achieve this advantage the riser (14) is dimensioned to be at least twice the width of the base (3). For example, FIG. 4 shows sprinkler apparatus (1) with a base (2) which has a width of 550 mm. Accordingly, a corresponding riser (14) is dimensioned with a length of at least 1100 mm.

Other embodiments envisaged include a sprinkler apparatus (1) with a base width of 360 mm and corresponding riser (14) with a length of at least 720 mm. This alternatively dimensioned embodiment is designed for irrigation of smaller trees and shrubs.

It should also be appreciated that in further alternative embodiments the riser (14) may be telescopic to allow for changes in length depending on application.

As would be obvious to a user, a sprinkler apparatus (1) such as those described above that fall over in use or have been knocked from their preferred upright position will not give optimum irrigation. The applicant has found that to maintain the sprinkler apparatus (1) in an upright position with sufficient stability, the riser (14) may extend no more than 5 times the width of the base (2).

It is envisaged that when the sprinkler apparatus (1) is connected and water flows through the conduits/tubing between the base (2) will provide stability when the sprinkler head (15) is distributing fluid. In addition to this, the base (2) and/or tubing is optionally filled with water to increase the weight and therefore the stability of the sprinkler apparatus (1).

In an alternative embodiment, the base could conceivably be in the form of at least one tube. For example, the base may comprise a plastic pipe which is positioned horizontally on a ground surface with inlet/outlet ports and a further aperture from which a riser extends vertically therefrom.

In use, the sprinkler apparatus (1) is placed above ground on a field, orchard or other area to be irrigated with effluent, liquid fertiliser or the like. The sprinkler apparatus (1) is connected to a fluid supply line (100) via the inlet conduit (5) to an irrigation system (not shown) for the distribution of effluent in known fashion.

Figure 5:
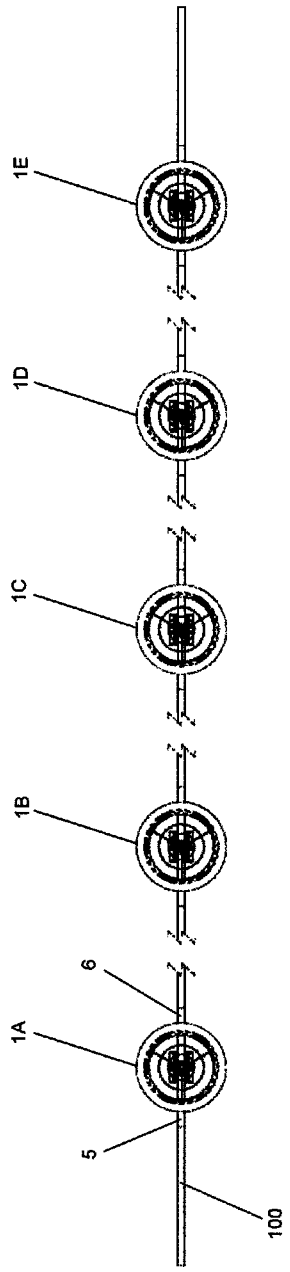
FIG. 5 shows a plan view showing an exemplary positioning of a plurality of sprinkler apparatus as shown in FIG. 1 connected in series as part of an irrigation system.
Figure 6:
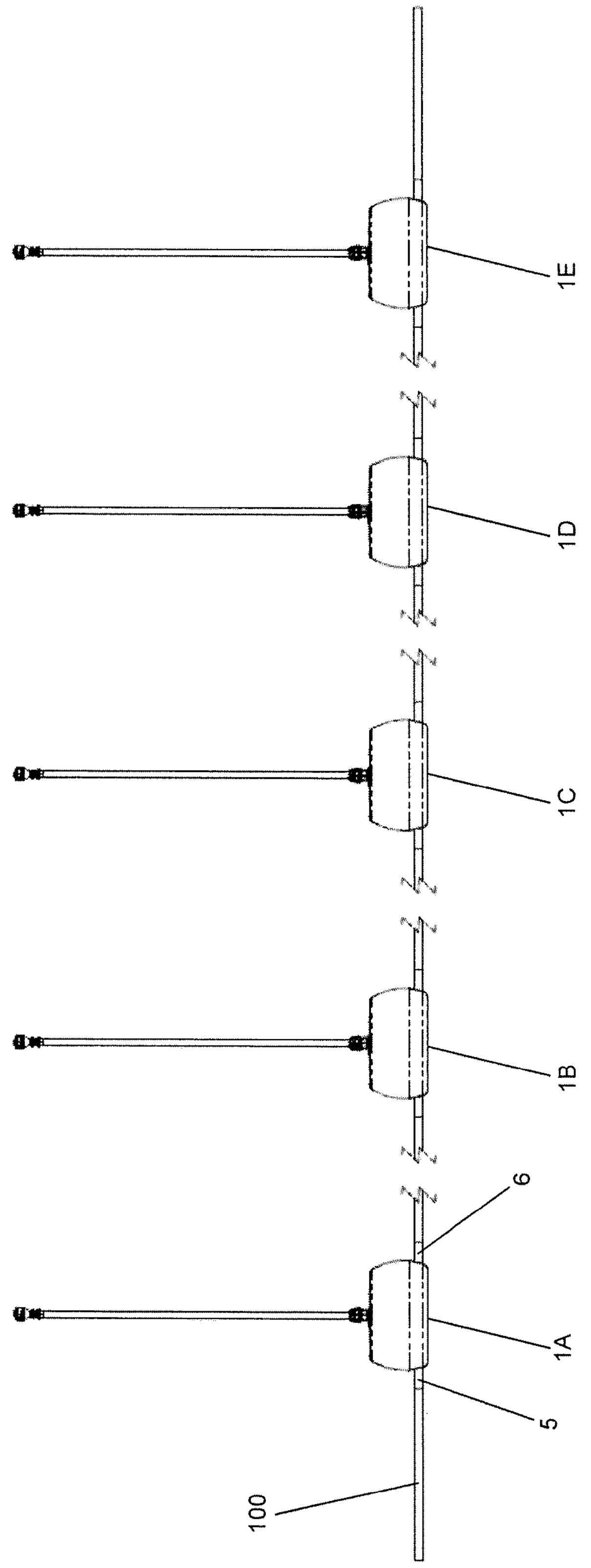
FIG. 6 shows a side view of the preferred embodiment as shown in FIG. 5.

FIG. 5 shows one example of many irrigation system configurations possible when using the sprinkler apparatus of the present invention. In this configuration, a sprinkler apparatus (1A) comprises one inlet conduit (5) and one outlet conduit (6) for linking the subsequent sprinkler apparatus (1B, C, D and E) in a series or string/line. In such a configuration the terminal sprinkler apparatus (1E) would include a stopper (not shown) to maintain pressure within the irrigation system. FIG. 6 shows a side view of the same configuration as FIG. 5. The sprinkler apparatus can be placed in any configuration desired by the user by connecting and disconnecting the releasable connectors (not shown) easily allowing formation of different configurations. This type of system can be moved from one location to another by an ATV or other farm vehicle. For example, a string or line of connected sprinkler apparatus can be pulled across the ground to the required location with the risers (14) and sprinkler head (15) being proud and elevated of the bases (2) in situ or disconnected from the base (2).

ADVANTAGES

There are many advantages associated with this invention which can include:

- The sprinkler system can be easily moved on a daily basis from one field to another, or within a field over the course of a day so the whole field is watered;
- The extended riser allows for sufficient irrigation of the top or canopy layer of trees, vines or other crop plants in a horticultural application;
- The extended riser can be optionally and easily detached for ease of transportation or interchange of varying length risers depending on application;
- The base of the sprinkler apparatus and relative height of the riser is configured to provide stability and maintain the riser/sprinkler head in an upright position in use;
- The base of the sprinkler apparatus is configured to ride over bumps when being transported;
- The sprinkler apparatus is light weight and easily manoevarable and transportable to wherever irrigation is required. For example, the sprinkler apparatus can be easily moved to an alternative field during fallow periods, removed for preparation of the field, seedling crops, mechanical crop maintenance or crop harvesting; and
- The spraying apparatus can be easily connected and disconnected to existing irrigation system to provide a modular system which is easily configurable depending on the user's requirements. For example, a string of two or more sprinkler apparatus can be pulled across the ground with the riser and sprinkler head being proud and elevated of the bases in situ or disconnected. Thus, the sprinkler apparatus are portable.

Aspects of the present invention have been described by way of example only and it should be appreciated that modifications and additions may be made thereto without departing from the scope thereof as defined in the appended claims.

What we claim is:

1. A sprinkler apparatus which comprises:

a sprinkler head;

a riser which is in fluid communication with a fluid inlet and the sprinkler head;

a base configured to sit on the ground and support and maintain the sprinkler head in an upright position; and wherein, the riser extends substantially vertically from the base a distance at least twice the width of the base, the base comprises at least one curved peripheral side wall extending from an outer edge of a generally planar bottom surface to form a rim, the outer edge being further from the center of the base than the generally planar bottom surface, and the said at least one curved peripheral side wall allows the base to be pulled over and slide along the ground when the sprinkler head is in the upright position.

2. The sprinkler apparatus as claimed in claim 1, wherein the riser extends substantially vertically from the base no more than five times the width of the base.

3. The sprinkler apparatus as claimed in claim 1, wherein the riser is telescopic and in use extends substantially vertically from the base at least twice the width of the base, but no more than five times the width of the base.

4. The sprinkler apparatus as claimed in claim 1, wherein, the width of the base is dimensioned to provide a stable platform to maintain the sprinkler head and riser in an upright position when the sprinkler is distributing fluid.

5. The sprinkler apparatus as claimed in claim 4, wherein the width of the base is dimensioned to be in the range of 360 mm to 550 mm.

6. The sprinkler apparatus as claimed in claim 1, wherein the base is in the form of at least one tube.

7. The sprinkler apparatus as claimed in claim 1, wherein the sprinkler apparatus is configured to releasably receive at least one conduit (fluid line) and provide a fluid connection from the at least one conduit to the riser and sprinkler head with fluid for irrigation.

8. The sprinkler apparatus as claimed in claim 7, wherein the fluid line(s) connect to the apparatus at a point which is along a bilateral axis of the base.

9. The sprinkler apparatus as claimed in claim 1, wherein the base is in the shape of a bowl with a flat base on the inside of a circular wall.

10. The sprinkler apparatus as claimed in claim 1, wherein the base and wall portion(s) are plastics or substantially of plastics.

11. An irrigation system for use with at least two sprinkler apparatus in a string as claimed in claim 1.

12. The irrigation system as claimed in claim 11 which comprises:

at least two sprinkler apparatus in a string; and a plurality of fluid conduits;

wherein, each of said sprinkler apparatus is configured to be releasably connected to:

at least two fluid conduits; or at least one fluid conduit and one stopper;

so as to create at least two sprinklers, or one line of sprinklers linked by one or more fluid conduits, that any number of sprinkler apparatus may be added thereto or removed therefrom depending on requirements of the area to be irrigated.

13. A kit of parts for a sprinkler apparatus which comprises:

a sprinkler head;

a riser which is in fluid communication with a fluid inlet and the sprinkler head;

a base configured to sit on the ground and support and maintain the sprinkler head in an upright position; and wherein the riser extends substantially vertically from the base a distance at least twice the width of the base, the base comprises at least one curved peripheral side wall extending from an outer edge of a generally planar bottom surface to form a rim, the outer edge being further from the center of the base than the generally planar bottom surface, and said at least one curved peripheral sidewall of the allowing the base to be pulled over and slide along the ground when the sprinkler head is in the upright position.

14. The sprinkler apparatus as claimed in claim 1, wherein the base comprises at least one side wall.

15. The sprinkler apparatus as claimed in claim 14, further comprising at least one hose line inlet port and at least one hose line outlet port.

16. The sprinkler apparatus as claimed in claim 15, wherein the at least one hose line outlet port is positioned in the side wall of the base.

17. A sprinkler apparatus which comprises:

a sprinkler head;

a riser which is in fluid communication with a fluid inlet and the sprinkler head; and a base for supporting and maintaining the sprinkler head in an upright position when the base sits on the ground, said base including a container portion that is filled with water to provide weight and additional stability to maintain the sprinkler head and riser in an upright position when the sprinkler head is distributing the fluid, wherein the riser extends substantially vertically from the base a distance at least twice the width of the base, the base comprises at least one curved peripheral side wall extending from an outer edge of a generally planar bottom surface to form a rim, the outer edge being further from the center of the base than the generally planar bottom surface, and said at least one curved peripheral sidewall of the base allowing the base to be pulled over and slide along the ground when the sprinkler head is in the upright position.

* * * * *